United States Patent [19]

Matsuda et al.

[11] Patent Number: 5,207,069

[45] Date of Patent: May 4, 1993

[54] CRYOSTAT VACUUM CHAMBER

[75] Inventors: Koichiro Matsuda; Toshiya Itoh, both of Kyoto; Shoichiro Togitani, Kusatsu; Etsuji Kawaguchi, Otsu, all of Japan

[73] Assignees: Horiba, Ltd., Kyoto; Iwatani International Corp., Osaka, both of Japan

[21] Appl. No.: 742,389

[22] Filed: Aug. 8, 1991

[30] Foreign Application Priority Data

Aug. 14, 1990 [JP] Japan .................. 2-215298

[51] Int. Cl.⁵ .............................. B01D 8/00
[52] U.S. Cl. .......................... 62/55.5; 55/269; 417/901

[58] Field of Search .............. 62/100, 268, 55.5; 55/269; 417/901

[56] References Cited

U.S. PATENT DOCUMENTS

| | | | |
|---|---|---|---|
| 4,757,689 | 7/1988 | Bachler et al. | 62/55.5 |
| 4,958,499 | 9/1990 | Haefner et al. | 62/55.5 |
| 5,001,903 | 3/1991 | Lessard et al. | 62/55.5 |

Primary Examiner—Ronald C. Capossela
Attorney, Agent, or Firm—Price, Gess & Ubell

[57] ABSTRACT

In a cryostat vacuum chamber encompassing a refrigerator and a sample table cooled by the refrigerator, a heater is provided for controlling a temperature of the sample table, and the refrigerator is also provided with separate heaters.

1 Claim, 2 Drawing Sheets

CRYOSTAT VACUUM CHAMBER

FIELD OF THE INVENTION

The present invention relates to cooled vacuum systems used in the development of materials and, more particularly, to a regulated cryostat used in vacuum systems such as those where impurities contained in a semiconductor are measured.

BACKGROUND OF THE INVENTION

Where impurities contained in a semiconductor are measured, it is necessary to maintain a sample of the semiconductor at an appointed temperature within the measurement facility, and to control the temperature between a high temperature and a low temperature. Conventionally, a cryostat as shown in FIG. 2 has been used.

Referring to the cryostat shown in FIG. 2, reference numeral 1 designates a vacuum chamber internally insulated from the air. The chamber 1 is provided on a suitable base 2 and depressurized to an appointed extent by a vacuum exhauster (not shown).

The vacuum chamber 1 is provided internally with a sample table 3 for holding a sample (not shown), such as a semiconductor, and a refrigerator 4 for cooling the sample table 3. The vacuum chamber 1 is also provided with a closing sample port (not shown) formed in the vicinity of the sample table 3, for placing the sample within the chamber 1 and removing the sample.

The refrigerator 4 is a two-stage refrigerator comprising a first-stage refrigerator 5 and a second-stage refrigerator 6. The second stage refrigerator 6 is provided over the first-stage refrigerator 5 and connected with the first-stage refrigerator 5, such- that the second-stage refrigerator 6 is cooled to an appointed temperature by the first-stage refrigerator 5. Likewise, the sample table 3 is cooled to an appointed temperature by the second-stage refrigerator 6.

The first-stage refrigerator 5 is connected with a compressor, a helium gas-storing medium, a pump, and the other refrigeration mechanics (not shown) through pipings 7, 8.

A heat conductor 9 having a high heat conductivity is provided over the second-stage refrigerator 6. The sample table 3 is held over the heat conductor 9 so as to be thermally connected with the refrigerator 4 through the heat conductor 9.

The heat conductor 9 is provided with a heater 10 wound therearound for controlling a temperature of the sample table 3. The sample table 3 is provided with a temperature sensor 11 for detecting the temperature of the sample table 3.

Reference numeral 12 designates a temperature-controlling apparatus provided outside of the vacuum chamber 1. The temperature controlling apparatus 12 maintains the temperature of the sample table 3 at an appointed temperature by causing heat to be emitted from the heater 10. The level of heat emitted is determined on the basis of the signal from the temperature sensor 11.

When the sample is exchanged from the chamber, the vacuum chamber 1 is brought into an open-air condition and then the sample port is opened. However, if the temperature of the sample table 3 and the refrigerator 4 are approximately 0° C. or less, they may become dewed. This is an unwanted and dangerous condition. It is therefore necessary to raise the temperature of the sample table 3 and the refrigerator 4 up to a temperature at which they are not dewed before the vacuum chamber 1 is brought into an open-air condition.

However, this conventional cryostat is only provided with the heater 10 for controlling the temperature of the sample table 3. Furthermore, the single heater 10 has a small calorific power. Therefore, the temperature of the sample table 3 and the refrigerator 4 can only be raised very slowly.

Additionally, because the refrigerator 4 is a two-stage refrigerator, it takes a longer time, in comparison with the sample table 3, to raise the temperature of the refrigerator 4 and, in turn, the system.

OBJECTS OF THE INVENTION

It is therefore an object of the present invention to provide a cryostat capable of raising the temperature of a sample table and a refrigerator up to an appointed value within a short time.

It is yet a further object of the present invention to provide a cryostat capable of raising the temperature of a sample table and a refrigerator to an appointed value simultaneously.

It is yet a still further object of the present invention to provide a cryostat system for shortening the time required for system operations other than the work on the sample workpiece, such as the exchange of the sample, as far as possible.

SUMMARY OF THE INVENTION

These and further objects of the present invention are achieved in the preferred embodiment by a cryostatic vacuum chamber where heaters are specifically provided at each stage of the refrigeration system. In the preferred embodiment, the vacuum chamber includes a refrigerator, a sample table cooled by the refrigerator, and a heater for controlling the temperature of the sample table. The refrigerator is also provided with a heater.

In the case where the refrigerator is composed of a multistage refrigerator, each refrigeration stage may be provided with an exclusive heater.

The preferred embodiment of the present invention thereby allows the temperature of the sample table and the refrigerator to be raised before the vacuum chamber is brought into an open-air condition. The temperatures can be raised to an appointed value within a short time and at almost the same time. Accordingly, the time required for operations other than the work on the sample workpiece or sample measurement, such as the exchange of the sample, can be shortened as far as possible.

BRIEF DESCRIPTION OF THE DRAWINGS

The present invention, both as to its organization and manner of operation, together with further objects and advantages, may be understood by reference to the following drawings.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein.

The preferred embodiment of the present invention will be below described with reference to the drawings.

Figure 1:
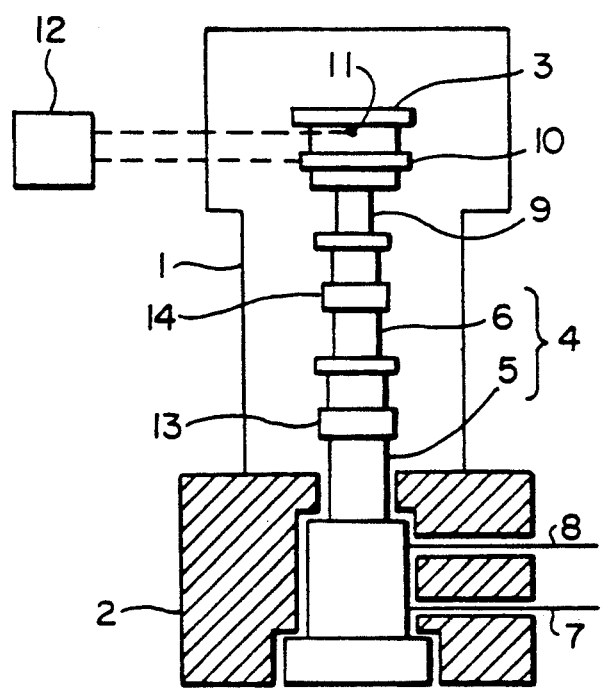
FIG. 1 is a diagram showing a cryostat vacuum chamber according to the preferred embodiment of the present invention.
Figure 2:
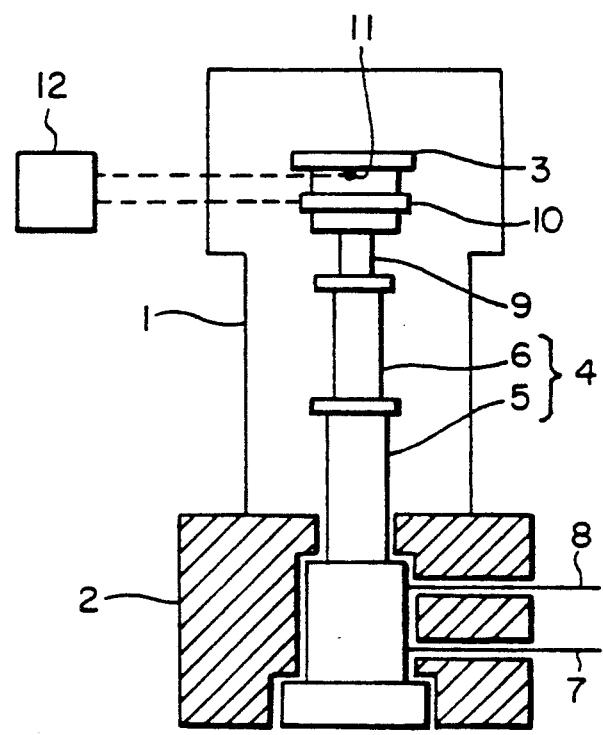
FIG. 2 is a diagram showing a conventional cryostat vacuum chamber.

Referring to FIG. 1 showing the preferred embodiment of the present invention, the same reference numerals as in FIG. 2 designate the same members as in FIG. 1.

Referring to FIG. 1, reference numerals 13, 14 designate heaters. The heaters 13, 14 are wound around the outer circumference of the first-stage refrigerator 5 and the second-stage refrigerator 6, respectively. Thus, each stage of the refrigerator 4 is provided with an exclusive heater 13, 14. These heaters 13, 14 are controlled by a temperature-controlling apparatus 12.

The calorific power of the respective heaters 13, 14 is set to conform to the heat capacity and heat conductivity of the first-stage and second-stage refrigerators 5, 6, respectively, and to closely coincide with a temperature-rising speed of a sample table 3 which is caused by a heater 10. When it is necessary to heat the sample table 3 and the refrigerator 4 to at least an appointed temperature before the vacuum chamber 1 is brought into an open-air condition, the sample table 3 and the refrigerator 4 can be heated to the appointed temperature within a short time, and at almost the same time by irradiating the sample table 3, the first-stage refrigerator 5, and the second-stage refrigerator 6 with heat from the heater 10, the heater 13, and the heater 14, respectively.

If the refrigerator 4 is a two-stage refrigerator, as in the above-described preferred embodiment, the refrigerators 5 and 6 are provided with exclusive heaters 13 and 14, respectively, so that there is only a negligible temperature difference between the refrigerator 1 and the sample table 3, if any at all. In the preferred embodiment, the heaters are placed at the bottommost and topmost portions of the refrigerator to provide the most effective heating capacity.

The invention should in no way be thought to be limited to the configuration of the preferred embodiment. For example, in the preferred embodiment the heaters 10, 13, and 14 are wound around the outer circumferences of the heat conductor 9, the refrigerator 5, and the refrigerator 6, respectively. However, other configurations would be sufficient as long as the heaters 10, 13, and 14 heat the sample table 3, the refrigerator 5, and the refrigerator 6, respectively.

Furthermore, it is conceived that the refrigerator 4 may be a single-stage refrigerator or, in the case where the refrigerator 4 is a multistage refrigerator, it is not always necessary to provide each physical refrigerator stage with an exclusive heater. In such cases, it is sufficient to determine positions (selective stages), where the respective heaters are to be provided. The calorific powers of the respective heaters can be set in view of the heat capacity and heat conductivity of the refrigerator's respectively determined stages.

In the preferred embodiment of the present invention, the sample table and refrigerator can be heated to the appointed temperature within a short time and at almost the same time. Accordingly, the time required for operations other than the proper measurement, such as the exchange of the sample, can be shortened as far as possible.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method to avoid dewing during pressurization of a vacuum chamber having a sample table, at least one refrigeration stage supporting the table, and heaters for controlling temperature of the stage or table, each stage or table having its own respective heater, the method comprising the steps of:

selecting an appointed temperature at which the vacuum chamber may be opened without dewing being caused on the stages and table;

heating the table to the appointed temperature;

heating each stage to the appointed temperature;

making the heating of each stage and the table coincide with a predetermined speed of heating; and opening the vacuum chamber only after the table and each stage has reached the appointed temperature.

* * * * *